United States Patent Office 3,540,901
Patented Nov. 17, 1970

3,540,901
REFRACTORY MAGNESIA SHAPES
Erich Kaltner, Leoben, Styria, Austria, assignor to Veitscher Magnesitwerke-Actien-Gesellschaft, Vienna, Austria, a corporation of Austria
No Drawing. Continuation of application Ser. No. 548,839, May 10, 1966. This application Sept. 30, 1968, Ser. No. 763,988
Claims priority, application Austria, May 14, 1965, A 4,420/65
Int. Cl. C04b 35/04
U.S. Cl. 106—60
7 Claims

ABSTRACT OF THE DISCLOSURE

An oxygen converter lining brick consisting of a tar-impregnated fired refractory body consisting mainly of MgO and including, on an "as calcined" basis, 2–5% $Fe_2O_3$, up to 2% $SiO_2$ and sufficient CaO so that the silica and ferric oxide are present substantially completely as dicalcium silicate and dicalcium ferrite.

REFERENCE TO RELATED APPLICATION

This is a continuation of my copending application Ser. No. 548,839, filed May 10, 1966 and now abandoned.

This invention relates to refractory magnesia shapes whose pores are filled with a carbonaceous impregnant.

The invention is more specifically concerned with refractory magnesia shapes which resist the chemical, thermal and mechanical stresses to which the refractory lining of a container is subjected when the container holds a ferrous melt, and substantially pure oxygen is injected into the melt for refining the same. The refractory shapes of the invention, therefore, find their most important field of application in steel refining processes such as the LD, Kaldo and Rotor processes.

Very good results have been obtained heretofore with refractory shapes prepared by firing a fairly pure sintered magnesite at high temperature and thereafter impregnating the pores of the fired shapes with a carbonaceous material.

An object of the invention is the provision of refractory magnesia shapes which are at least as resistant to the stresses enumerated above as the pure refractories but which may be prepared from less pure and, therefore, much less costly raw materials.

The invention thus resides in one of its aspects in a refractory shape of critically limited composition, in another aspect in certain steps of a method of preparing the shape, and also in the use of the refractory shape in an oxygen-operated converter in which the shapes of the invention show unexpectedly favorable results.

The term "refractory shape," as employed throughout this specification and appended claims, will be understood to include bricks, plates and other bodies of the type employed for constructing or lining metallurgical furnaces.

The refractory shapes of the invention each consist of a porous body of refractory material, and of a carbonaceous impregnant which substantially fills the pores of the refractory body. The composition of the latter is at the core of this invention. Composition percentages will be given hereinafter as percent by weight on an "as calcined basis," unless otherwie specifically stated. Water, carbon dioxide and similar volatile constituents will be disregarded, if present.

The iron content of the refractory material in the shapes of the present invention must be between 2 and 5 percent $Fe_2O_3$, and is preferably held between 2.5 and 4 percent. Enough CaO must be present to combine with the ferric oxide to dicalcium ferrite, and any excess of lime over that required for combining with the ferric oxide should be present as dicalcium silicate. Only negligible amounts of free $Fe_2O_3$, $SiO_2$ or CaO may be present. The total $SiO_2$ should preferably not exceed 2%, and a silica content of substantially more than one percent is not permissible if best results are to be obtained.

The porous body of refractory material is to be so completely impregnated with carbonaceous material that the residual free pore volume does not exceed 2% of the total volume of the refractory shape when the full advantages of this invention are to be secured.

The starting material for making the refractory shapes of the invention is prepared by adding enough $Fe_2O_3$, CaO and/or $SiO_2$ to magnesite or magnesia until the mixture satisfies the composition limits indicated above, classifying the material according to grain size, combining selected grain size fractions in a known manner, and firing the material, whereupon it is impregnated with tar or pitch, which is largely converted to carbon either in a preliminary high-temperature treatment or during use in the steel converter.

The proper stoichiometric relationship of the minor ingredients ($Fe_3O_4$, CaO, $SiO_2$) is essential, and it is particularly important that the finished shapes be practically free of uncombined calcium oxide. Most of the CaO should be present as calcium ferrite, the amount of calcium ferrite being 3.5–8.5 percent, when the $Fe_2O_3$ is held between 2 and 5%. The calcium ferrite is preferably held between 4 and 7%, corresponding to an $Fe_2O_3$ content of 2.5 to 4%. A small amount of silica should be sufficient to combine with all the CaO not bound to iron.

The shapes of the invention thus should conform to the following values in percent by weight:

MgO—84–95%, preferably 88–93%
$SiO_2$—0.1–2%, preferably 0.3–1%
$Fe_2O_3$—2–5%, preferably 2.5–4%
CaO—2–8%, preferably 3–6%

Impurities, that is, elements other than those listed above, should not maerially exceed one percent.

The compositions listed above are readily obtained by combining different grades of sintered magnesite with each other or with substances which yield CaO and/or $Fe_2O_3$ on firing. The dicalcium ferrite and dicalcium silicate phases are normally formed during firing.

It is preferred to adjust the composition of the raw materials even before sintering. Any magnesite which contains enough MgO to satisfy the composition limits indicated above and does not contain more $Fe_2O_3$ may be employed. An excess of CaO and/or $SiO_2$ can readily be removed by flotation and by similar wet refining processes. Contrary to the manufacture of known high-quality magnesia refractories, a very high percentage of MgO or an unusually low percentage of the minor constituents $Fe_2O_3$, CaO and $SiO_2$ is not called for. Many magnesites are so low in CaO that they must be enriched with limestone or dolomite to meet the composition limits indicated above. When the refractory bodies of the invention are to be prepared from synthetic, substantially pure MgO, enrichment with iron oxide and lime is necessary.

If the raw materials are not originally available in finely comminuted form, they are ground prior to sintering in order to establish a proper phase equilibrium during sintering. The raw mixture should be ground to a grain size of no more than 500 microns, but best results are obtained with grain sizes of 100 microns or less.

The finely pulverized mixture is briquetted or otherwise compressed into a green, shape retaining compact prior to sintering by means of pressure rolls or an extruder, or in any other conventional manner, whereupon the compact is fired in a shaft furnace or rotary furnace. The firing temperature must be high enough to ensure phase equilibrium. It should, therefore, be above 1500° C., and preferably near 1800° C. Even higher temperatures may be used and have proved to be advantageous.

The sintered product is classified according to particle size, and selected fractions, such as coarse and fine fractions without the intermediate fractions, are mixed, shaped and fired at high temperatures, for example 1650° C., until the desired high mechanical strength is achieved. The refractory porous body so obtained is then impregnated with a carbonaceous material, preferably tar or other residue from the distillation of bituminous coal, of petroleum, or of wood, by saturation under alternatingly applied vacuum and pressure. The residual porosity of the impregnated refractory shape should not exceed 2%.

The calcium ferrite present during the preliminary sintering and the ultimate firing of the refractory bodies has been found to enhance the density of the refractory product and the growth of periclase crystals so that the product is coarsely crystalline and contains relatively small pores. The porosity of the fired refractory body is typically 13 to 15% by volume as compared to about 20% in similar bodies prepared from material of conventional composition.

The wear of the refractory shapes of the invention in oxygen converters is substantially smaller than that of refractories in which the iron oxide is not substantially completely converted to calcium ferrite. There is a very close correlation between the amount of iron present outside of calcium ferrite, and the crystal size and porosity of the refractory body. High density in the refractory product requires sufficient CaO to prevent the iron from forming compounds with the large excess of MgO present, while an excess of CaO over that bound to iron is detrimental to the density of the refractory body.

The high density (low porosity) and the large size of the periclase crystals in the refractory bodies of the invention are believed mainly to account for the long useful life of the refractory shapes of the invention, but it is surprising that the presence of calcium ferrite in relatively large amounts is not harmful. Dicalcium ferrite has a relatively low melting point so that it would be expected to act as a flux for the more refractory ingredients, and to cause more rapid wear of the refractory shapes under the conditions prevailing in an oxygen converter.

Quite surprisingly, dicalcium ferrite does not have the effects of a flux under the conditions prevailing in an oxygen converter. It is known that a reducing atmosphere containing CO prevails in the converter while oxygen is being injected into the carbon-bearing ferrous melt. It is believed that the dicalcium ferrite is converted to an extremely heat resistant mixture of metallic iron and calcium oxide by the carbon monoxide of the atmosphere and by carbon from the impregnation.

It is, therefore, necessary to keep the $Fe_2O_3$ content of the refractory body at or above 2%, and preferably above 2.5%. When the refractory bodies contain more than 5% $Fe_2O_3$, their heat resistance is significantly impaired. Even when the iron content of the refractory bodies of the invention is kept between the indicated limits, the most valuable properties of the refractory shapes of the invention are not utilized unless they form the walls of a vessel in which a ferrous melt is treated under reducing conditions, such as those prevailing in the oxygen steel making processes enumerated above.

The following examples are further illustrative of the invention, and it will be understood that the invention is not limited thereto.

EXAMPLE I

In a crude magnesite having the following analysis in percent by weight:

| | Percent |
|---|---|
| $SiO_2$ | 2.38 |
| $Fe_2O_3$ | 1.72 |
| $Al_2O_3$ | 0.20 |
| CaO | 3.67 |
| MgO | 43.13 |
| Ignition loss | 48.90 | the $SiO_2$- and CaO content is reduced by flotation to such an extent that after comminuting and briquetting of the concentrate gained by flotation and calcining the briquets in a shaft furnace at a temperature of about 2150° the resulting magnesia sinter has the following analysis on calcined basis in percent by weight:

| | Percent |
|---|---|
| $SiO_2$ | 0.88 |
| $Fe_2O_3$ | 3.66 |
| $Al_2O_3$ | 0.44 |
| CaO | 4.42 |
| MgO (by difference) | 90.60 |

From these figures the following phase analysis may be calculated

| | Percent |
|---|---|
| Dicalcium silicate $2CaO.SiO_2$ | 2.52 |
| Tetracalcium aluminoferrite (brownmillerite) $4CaO.Al_2O_3.Fe_2O_3$ | 2.10 |
| Dicalcium ferrite $2CaO.Fe_2O_3$ | 4.38 |

It is seen that all the CaO is combined to dicalcium silicate, which also includes all the $SiO_2$, dicalcium ferrite, and brownmillerite, the latter also including the $Al_2O_3$ present. Brownmillerite behaves similar to dicalcium ferrite and may be regarded, for the purposes of the present invention, equivalent to it. The calculation shows an excess of 0.40% $Fe_2O_3$. This, however, is embedded in the periclase crystals and is in the said amount not detrimental to the purposes of the invention.

The magnesia sinter is crushed, graded and formed into bricks in a manner known in the art and the bricks are fired and afterwards impregnated with heavy tar at a temperature of about 200° C. and under vacuum of 100 mm. Hg.

EXAMPLE II

A crude magnesite is used having the following analysis in percent by weight:

| | Percent |
|---|---|
| $SiO_2$ | 0.57 |
| $Fe_2O_3$ | 2.41 |
| $Al_2O_3$ | 0.36 |
| CaO | 2.28 |
| MgO | 43.93 |
| Ignition loss | 50.45 |

As the CaO-content is too low for the purposes of the present invention 3% dolomite are added to 100% of the magnesite, the dolomite having the analysis in percent by weight:

| | Percent |
|---|---|
| $SiO_2$ | 1.35 |
| $Fe_2O_3$ | 0.70 |
| $Al_2O_3$ | 0.36 |
| CaO | 31.31 |
| MgO | 20.90 |
| Ignition loss | 45.38 |

Both materials are comminuted to a grain size below 200 microns, mixed thoroughly and the mixture is formed into briquets which are calcined in a shaft kiln at a temperature of about 1800° C. The resulting magnesia sinter has the following analysis in percent by weight on the calcined basis:

| | Percent |
|---|---|
| $SiO_2$ | 1.19 |
| $Fe_2O_3$ | 4.75 |
| $Al_2O_3$ | 0.72 |
| CaO | 6.30 |
| MgO | 87.04 |

Forming of bricks and impregnating them with tar is accomplished in the manner set forth in Example I.

While the invention has been described with particular reference to preferred embodiments, it is to be understood that it is not limited thereto, but is to be construed broadly, and to be limited solely by the scope and spirit of the appended claims.

I claim:

1. A method of making a refractory shape from a refractory raw material consisting mainly of magnesium oxide and the oxides $SiO_2$, $Fe_2O_3$ and CaO, comprising the steps of comminuting the raw material to grains of a size of no more than 500 microns; compressing the grains into shape retaining compacts; firing the compacts, the fired compacts containing, on an "as calcined" basis, by weight, 84–95% MgO, 0.1–2% $SiO_2$, 2.5–4% $Fe_2O_3$, 2–8% CaO, and not substantially more than 1% impurities, and the amount of at least one of the oxides $SiO_2$, $Fe_2O_3$ and CaO having been changed in the raw material before firing so that the latter oxides are present in the fired compacts substantially completely combined with each other as dicalcium silicate and dicalcium ferrite; crushing the fired compacts; forming the crushed material into shapes and heating the shapes to a temperature and for a time sufficient to sinter the shapes into a porous body; and impregnating the sintered porous body with a carbonaceous impregnant until it has a residual pore volume no greater than 2% of the volume of said body.

2. The method of claim 1, wherein the compacts are fired at a temperature exceeding 1500° C.

3. The method of claim 2, wherein the shapes are heated at a temperature of 1650° C.

4. The method of claim 1, wherein at least one of the oxides $SiO_2$, $Fe_2O_3$ and CaO is admixed to the raw material to change the composition of the raw material before firing.

5. The method of claim 1, wherein $SiO_2$ is removed from the raw material to change the composition of the raw material before firing.

6. The method of claim 1, wherein CaO is removed from the raw material to change the composition of the raw material before firing.

7. The method of claim 1, wherein $SiO_2$ and CaO are removed from the raw material to change the composition of the raw material before firing.

References Cited
UNITED STATES PATENTS

| | | |
|---|---|---|
| 1,965,605 | 7/1934 | McCaughey et al. |
| 2,447,412 | 8/1948 | Heuer. |
| 3,141,790 | 7/1964 | Davies et al. |
| 3,288,617 | 11/1966 | Heuer. |

JAMES E. POER, Primary Examiner